(12) United States Patent
Levenstein et al.

(10) Patent No.: US 7,401,186 B2
(45) Date of Patent: Jul. 15, 2008

(54) SYSTEM AND METHOD FOR TRACKING CHANGES IN L1 DATA CACHE DIRECTORY

(75) Inventors: Sheldon B. Levenstein, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 11/054,273

(22) Filed: Feb. 9, 2005

(65) Prior Publication Data

US 2006/0179221 A1    Aug. 10, 2006

(51) Int. Cl.
*G06F 12/00* (2006.01)
(52) U.S. Cl. .................. 711/133; 711/131; 711/134
(58) Field of Classification Search ............... None
See application file for complete search history.

(56) References Cited

U.S. PATENT DOCUMENTS

| | | | | |
|---|---|---|---|---|
| 6,081,872 | A * | 6/2000 | Matick et al. | 711/122 |
| 6,339,813 | B1 * | 1/2002 | Smith et al. | 711/144 |
| 6,519,682 | B2 * | 2/2003 | Richardson et al. | 711/122 |
| 6,782,452 | B2 * | 8/2004 | Williams, III | 711/133 |
| 2002/0103971 | A1 * | 8/2002 | Saito et al. | 711/118 |

* cited by examiner

*Primary Examiner*—Hyung Sough
*Assistant Examiner*—Kaushikkumar Patel
(74) *Attorney, Agent, or Firm*—Duke W. Yee; Dianan R. Gerhardt; Gerald H. Glanzman

(57) ABSTRACT

Method, system and computer program product for tracking changes in an L1 data cache directory. A method for tracking changes in an L1 data cache directory determines if data to be written to the L1 data cache is to be written to an address to be changed from an old address to a new address. If it is determined that the data to be written is to be written to an address to be changed, a determination is made if the data to be written is associated with the old address or the new address. If it is determined that the data is to be written to the new address, the data is allowed to be written to the new address following a prescribed delay after the address to be changed is changed. The method is preferably implemented in a system that provides a Store Queue (STQU) design that includes a Content Addressable Memory (CAM)-based store address tracking mechanism that includes early and late write CAM ports. The method eliminates time windows and the need for an extra copy of the L1 data cache directory.

3 Claims, 3 Drawing Sheets

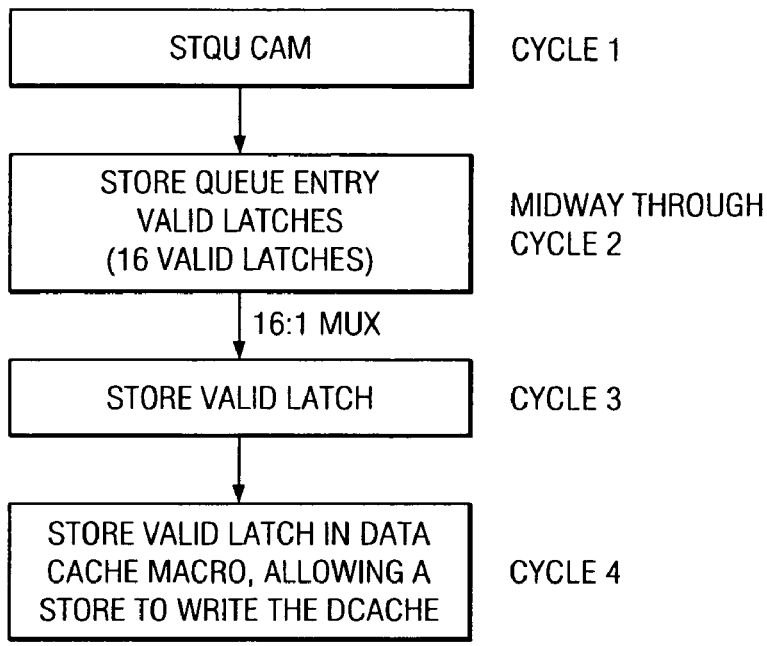
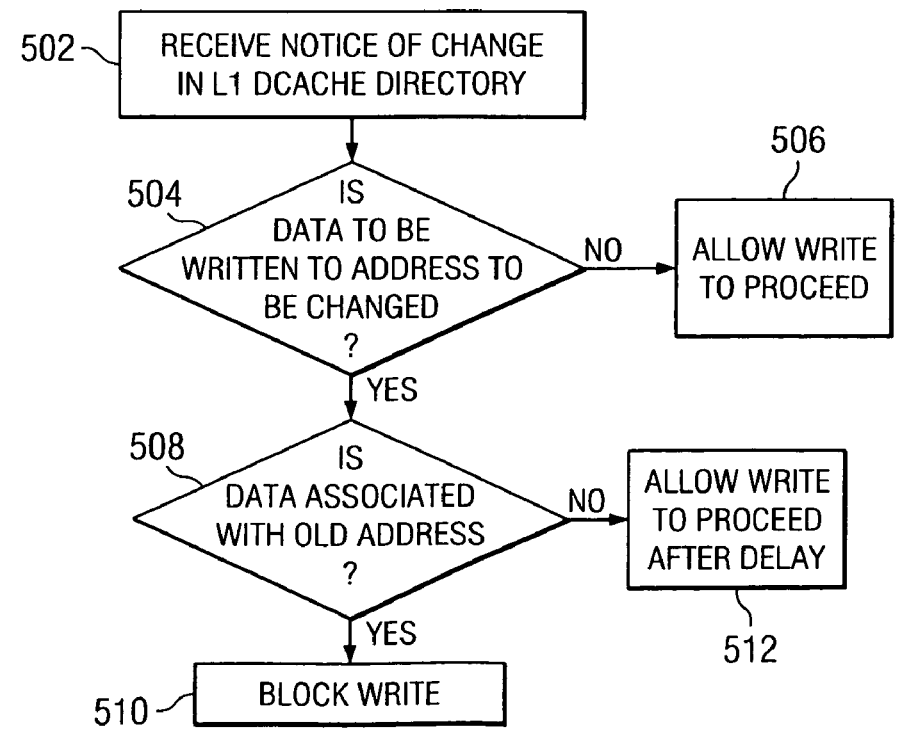

SYSTEM AND METHOD FOR TRACKING CHANGES IN L1 DATA CACHE DIRECTORY

BACKGROUND OF THE INVENTION

1. Technical Field

The present invention relates generally to the data processing field and, more particularly, to a method, system and computer program product for tracking changes in a Level 1 data cache directory in a processor in a data processing system.

2. Description of Related Art

A processor, such as a microprocessor, in a data processing system typically employs a built-in Level 1 (L1) memory cache to reduce the average time to access memory. An L1 cache includes both data and instructions and is effective because many programs tend to access the same data or instructions over and over, and by maintaining as much of this information as possible in the L1 cache, the processor may often avoid having to access the slower main memory of the data processing system.

An L1 data cache directory (L1 DCache directory) as used in current systems consists of 32 entries×16 way associative× about 50 bits of address and miscellaneous information (32× 16=512 entries×50 bits). This design results in substantial time windows and requires an extra copy of the L1 DCache directory to properly maintain the directory and to avoid losing data due to changes in directory allocation. This extra L1 DCache directory requires a great deal of area in the L1 DCache.

It would, accordingly, be desirable to provide a mechanism for tracking changes in a Level 1 data cache directory in a processor in a data processing system that will eliminate time windows from the design and also eliminate the need for an extra L1 DCache directory.

SUMMARY OF THE INVENTION

The present invention provides a method, system and computer program product for tracking changes in an L1 data cache directory. A method for tracking changes in an L1 data cache directory as data is written to an L1 data cache includes determining if data to be written to the L1 data cache is to be written to an address to be changed from an old address to a new address. If it is determined that the data to be written is to be written to an address to be changed, a determination is made if the data to be written is associated with the old address or the new address. If it is determined that the data is to be written to the new address, the data is allowed to be written to the new address following a prescribed delay after the address to be changed is changed.

The method is preferably implemented in a system that provides a Store Queue (STQU) design that includes a Content Addressable Memory (CAM)-based store address tracking mechanism that includes early and late write CAM ports that are allocated to each of two store pipelines, one per cycle. The invention eliminates time windows and the need for an extra copy of the L1 data cache directory thus resulting in a large area savings in the L1 data cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram that illustrates the data flow between the CAM operation and any store write to the L1 DCache to assist in explaining the present invention; and FIG. 5 is a flowchart that illustrates a method for tracking changes in an L1 data cache directory according to a preferred embodiment of the present invention.

DETAILED DESCRIPTION OF THE PREFERRED EMBODIMENT

Figure 1:
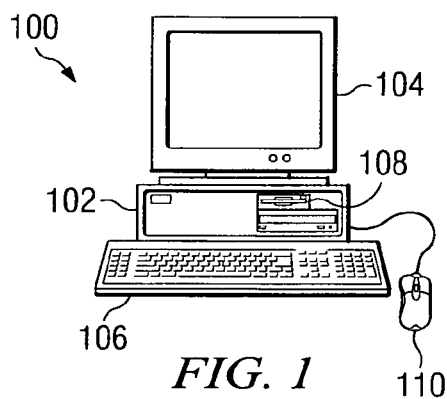
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
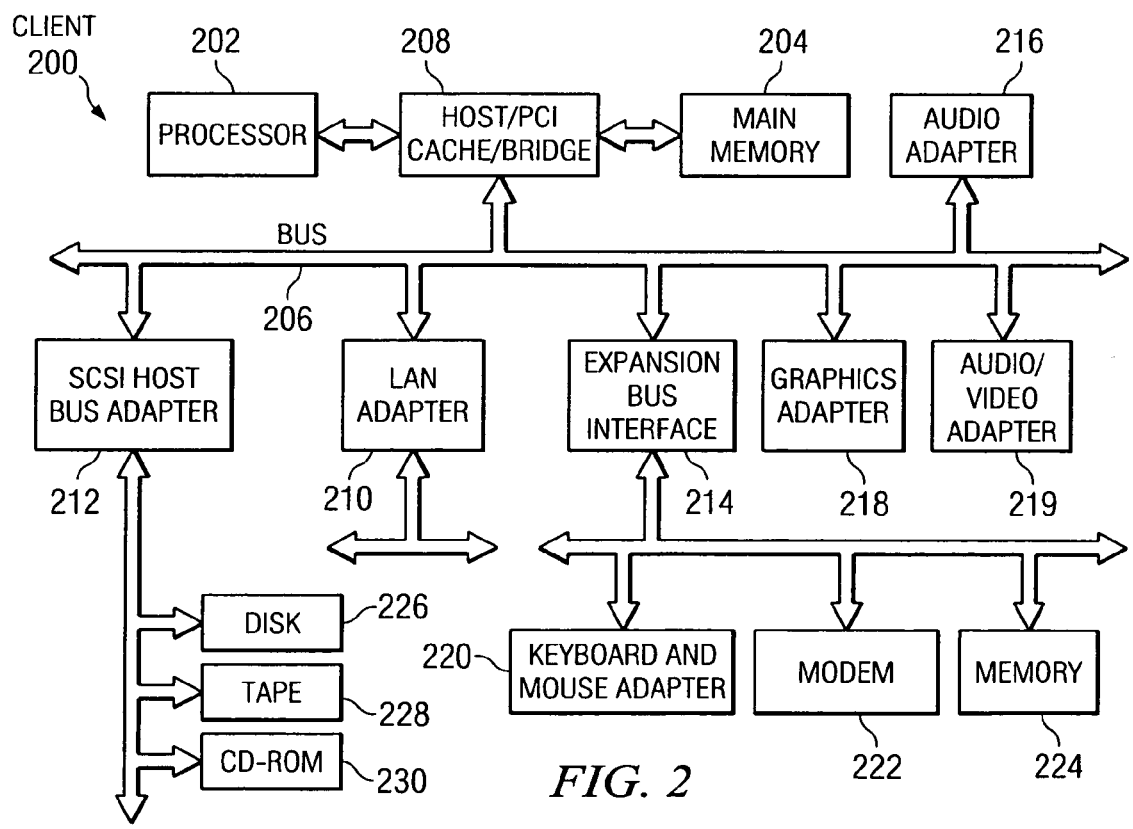
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

A microprocessor in a data processing system, such as processor 202 in FIG. 2, typically employs a built-in Level 1 (L1) memory cache to reduce the average time required to access memory. The L1 cache includes both data and instructions and is effective because many programs tend to access the same data or instructions over and over, and by maintaining as much of this information as possible in the L1 cache, the microprocessor may often avoid having to access the slower main memory of the data processing system. The present invention is directed to a mechanism for tracking changes in an L1 data cache directory. In particular, the present invention provides a Store Queue (STQU) design that includes a Content Addressable Memory (CAM)-based store address tracking mechanism that tracks changes in an L1 data cache directory.

As described previously, an L1 directory used in current systems consists of 32 entries×16 way associative×about 50 bits of address and miscellaneous information (32×16=512 entries×50 bits). This design results in substantial time windows and requires an extra copy of the L1 DCache directory.

In contrast, a Store Queue (STQU) design according to a preferred embodiment of the present invention is a CAM-based design that consists of one entry per store queue (16 entries total), each having 11 bits (nine data bits and two parity bits) (16 entries×11 bits) and two CAM ports. This results in the elimination of time windows and the elimination of a third L1 Dcache directory which provides a very significant savings in area.

Figure 3:
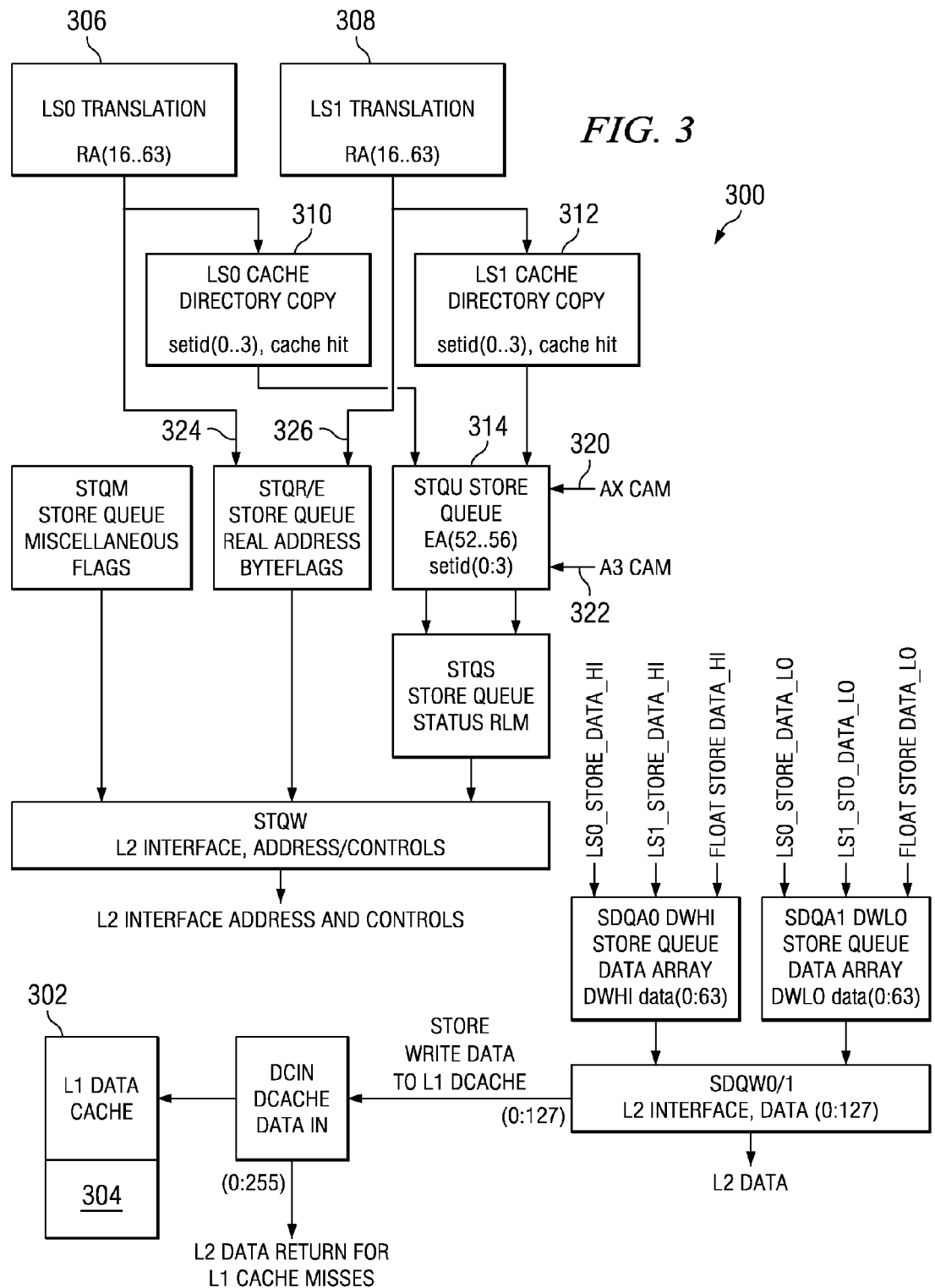
FIG. 3 is a block diagram that illustrates a system for tracking changes in an L1 data cache directory according to a preferred embodiment of the present invention.

FIG. 3 is a block diagram that illustrates a system for tracking changes in an L1 data cache directory according to a preferred embodiment of the present invention. The system is generally designated by reference number 300 and includes an L1 data cache (L1 DCache) 302 incorporated in a processor, such as processor 202 in FIG. 2, in a data processing system. As shown in FIG. 3, L1 DCache 302 includes an L1 data cache directory (L1 DCache directory) 304. System 300 is designed for use in a multiple-thread environment, although it should be understood that the invention is not limited to a multiple thread environment.

System 300 also includes Load/Store units 306 and 308 associated with different pipelines from which data to be written flows to L1 DCache 302. A copy of L1 DCache directory 304 is provided for each pipeline, as shown at 310 and 312.

Data flows from Load/Store units 306 and 308 to L1 DCache 302 via store queue (STQU) 314. STQU 314 is a CAM-based store address tracking mechanism for tracking changes in L1 DCache directory 304. The CAM-based mechanism includes early and late write CAM ports 320 and 322 and two write ports 324 and 326. The two write ports are allocated to each of the two store pipelines, one per cycle. The early and late write CAM ports 320 and 322 are allocated to changes in the L1 DCache directory mapping.

Early write CAM port 320 is enabled three cycles early (three cycles before the L1 DCache directory is written for a new cache line) so as to be able to indicate that a particular store should no longer be written to the L1 DCache because the entry has been reallocated to another operation. Three cycles of lead time are needed in order to have the CAM comparison done quickly enough to block writes to the L1 DCache four cycles later, by which time the L1 Cache will have been validated for new data that the processor could be fetching at a subsequent time.

Late write CAM port 322 is enabled three cycles after the L1 DCache directory is written for a new cache line. This is necessary because stores do their lookup in the AO cycle but are not actually written to the CAM until the end of the A4 cycle. In particular, the store queue STQU status check prior to writing the L1 DCache is pipelined too, and there is a four cycle delay between the CAM operation and any store write to the L1 DCache which could be blocked by the results of the CAM operation.

FIG. 4 is a diagram that illustrates the data flow between the CAM operation and any store write to the L1 DCache to assist in explaining the present invention. As shown in FIG. 4, the CAM itself requires a cycle, and then there is a processing cycle when the store queue entry is selected. There is a transmit cycle to the data cache; and the data cache write operation also requires a cycle. To make this work; the CAM must be done three cycles early so the stores written to the L1 DCache do not overwrite new data. The late write CAM port write must be done three cycles late in order to avoid missing a transition. This action permits an extra L1 DCache directory to be eliminated from the system. In particular, pipelined processor designs generally share the same pipeline for loads and stores since both require the same address generation and translation facilities. Loads require the use of the directory for determining cache hit or cache miss. In this design, stores use the same cache directory read cycle as loads. The STQU array then monitors the store queue directory for subsequent changes prior to the store writing the L1 DCache.

Thus, L1 DCache miss logic must give an early indicator to the store queue so that changes in the L1 DCache directory for lines being brought into the L1 cache can be monitored as written, and so that a cache line that is replaced can be regarded as no longer valid.

Mechanisms are also required to block line fills for which stores are pending since, by definition, the load data would be stale. In addition, loads must check against stores. First, loads must check against stores already in flight at the time the load reads the L1 DCache. If the load is determined to be a cache miss, and there is already an older store in flight, then the data that the load would bring back would be stale, and must be written invalid since the load may be bringing in stale data from the L2 Cache. Second, stores after a load cache miss must be compared against all pending load cache misses. If they match, then it is known that the load cache miss will bring in stale data.

FIG. 5 is a flowchart that illustrates a method for tracking changes in a Level 1 data cache directory according to a preferred embodiment of the present invention. The method is generally designated by reference number 500, and begins when a notice is received of a change in the L1 DCache directory (Step 502). A determination is then made if data to be written is to be written to an address to be changed (Step 504). As described previously, this determination is made three cycles before the directory is written for a new cache line so as to be able to indicate that a particular store should no longer be written to the L1 DCache because the entry has been reallocated to another operation. If it is determined that the data is not to be written to an address to be changed (No output of Step 504), the write is allowed to proceed (Step 506).

If it is determined that the data is to be written to an address to be changed (Yes output of Step 504), a determination is then made whether the data to be written is associated with the new address or the old address (Step 508). If it is determined that the data is to be written to the old address (Yes output of Step 508), the write is blocked (Step 510). If it is determined that the data is to be written to the new address (No output of Step 510), the write is allowed to proceed after a three cycle delay (Step 512). As described previously, this delay is necessary because stores do their lookup in the A0 cycle but are not actually written to the CAM until the end of the A4 cycle. As a result, three write operations may have been missed, so the late write CAM port write must be done three cycles late in order to avoid missing a transition.

In general, it should be understood that although in the preferred embodiment described herein, Early write CAM port 320 is enabled three cycles early, and Late write CAM port 322 is enabled three cycles after the L1 DCache directory is written for a new cache line, it is not intended to limit the invention to any particular number of cycles delay. In essence, there is a design dependent amount of delay between looking up the directory and writing the STQU CAM. Then there is another design dependent amount of time between a CAM operation and how many cycles it takes to tell the data cache to do a write or not. Although in the preferred system described herein, both operations require three cycles, in other designs the operations may require more or less than three cycles for one or both operations. The late CAM port handles the latency between directory read and CAM write, and the early CAM port handles the latency between CAM and store write to the L1 DCache.

The present invention thus provides a method, system and computer program product for tracking changes in an L1 data cache directory. A method for tracking changes in an L1 data cache directory as data is written to an L1 data cache includes determining if data to be written to the L1 data cache is to be written to an address to be changed from an old address to a new address. If it is determined that the data to be written is to be written to an address to be changed, a determination is made if the data to be written is associated with the old address or the new address. If it is determined that the data is to be written to the new address, the data is allowed to be written to the new address following a prescribed delay after the address to be changed is changed.

The method is preferably implemented in a system that provides a Store Queue (STQU) design that includes a Content Addressable Memory (CAM)-based store address tracking mechanism that includes early and late write CAM ports that are allocated to each of two store pipelines, one per cycle. The invention eliminates time windows and the need for an extra copy of the L1 data cache directory thus resulting in a large area savings in the L1 data cache.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for tracking changes in an L1 data cache directory as data is written to an L1 data cache, comprising:
    an L1 data cache including an L1 data cache directory; and
    a Content Addressable Memory store address tracking mechanism for tracking changes in the L1 data cache directory, the Content Addressable Memory store address tracking mechanism including:
    an early write port that is enabled before the L1 cache directory is written for a new cache line for determining if data to be written to the L1 data cache is to be written to an address to be changed from an old address to a new address; and a late write port that is enabled following a determination that the L1 data cache is to be written to the new address for allowing the data to be written to the L1 data cache, wherein the late write port is enabled following a prescribed delay.

2. The system according to claim 1, wherein the early write port is enabled three cycles before the address is changed from the old address to the new address.

3. The system according to claim 1, wherein the prescribed delay is three cycles after the address to be changed is changed.

* * * * *